United States Patent
Takaragi et al.

(10) Patent No.: US 7,900,261 B2
(45) Date of Patent: Mar. 1, 2011

(54) FILE ACCESS AUTHORIZATION MANAGEMENT APPARATUS AND METHOD

(75) Inventors: Yoichi Takaragi, Yokohama (JP); Tsutomu Murayama, Yokohama (JP); Shinichi Fukada, Kawasaki (JP); Junichi Takano, Kawasaki (JP); Kunio Yoshihara, Hachioji (JP)

(73) Assignee: Canon Kabushiki Kaisha (JP)

( * ) Notice: Subject to any disclaimer, the term of this patent is extended or adjusted under 35 U.S.C. 154(b) by 937 days.

(21) Appl. No.: 11/742,719

(22) Filed: May 1, 2007

(65) Prior Publication Data

US 2007/0288991 A1 Dec. 13, 2007

(30) Foreign Application Priority Data

May 25, 2006 (JP) ............................. 2006-145883

(51) Int. Cl.
*G06F 21/24* (2006.01)
(52) U.S. Cl. .................. 726/26; 726/1; 726/30; 705/50; 705/52
(58) Field of Classification Search ........................ None
See application file for complete search history.

(56) References Cited

U.S. PATENT DOCUMENTS

| | | | |
|---|---|---|---|
| 5,715,403 A * | 2/1998 | Stefik | 705/44 |
| 5,765,170 A * | 6/1998 | Morikawa | 1/1 |
| 6,381,634 B1 * | 4/2002 | Tello et al. | 709/206 |
| 7,062,532 B1 * | 6/2006 | Sweat et al. | 709/205 |
| 7,318,238 B2 * | 1/2008 | Elvanoglu et al. | 726/30 |
| 7,640,582 B2 * | 12/2009 | Beck | 726/21 |
| 2003/0158865 A1 * | 8/2003 | Renkes et al. | 707/200 |
| 2003/0188198 A1 * | 10/2003 | Holdsworth et al. | 713/201 |
| 2004/0254884 A1 * | 12/2004 | Haber et al. | 705/51 |
| 2005/0044170 A1 * | 2/2005 | Cox et al. | 709/217 |
| 2005/0216827 A1 * | 9/2005 | Mochizuki | 715/511 |
| 2005/0234828 A1 * | 10/2005 | Matsuyama et al. | 705/51 |
| 2005/0257140 A1 * | 11/2005 | Marukawa | 715/513 |
| 2007/0214497 A1 * | 9/2007 | Montgomery et al. | 726/4 |

FOREIGN PATENT DOCUMENTS

| EP | 1130490 A2 * | 9/2001 |
|---|---|---|
| JP | 2005-346366 A | 12/2005 |

* cited by examiner

*Primary Examiner*—Ponnoreay Pich
(74) *Attorney, Agent, or Firm*—Rossi, Kimms & McDowell LLP (57) ABSTRACT

In an information processing apparatus which divides a memory area into a plurality of boxes and manages data stored in each box, security information containing at least an editing condition and an output condition set for each box is stored. In transmitting data stored in a box to an external device, security information for the transmission target data is set based on the security information set in the box. When the security information set in the box is changed, security information set for the data corresponding to the box is also changed.

15 Claims, 12 Drawing Sheets

| BOX ID 401 | TRANSFER 402 | CHANGE 403 | ERASE 404 | COLOR PRINTING 405 | MONOCHROME PRINTING 406 | STORAGE TIME-LIMIT 407 |
|---|---|---|---|---|---|---|
| 001 | OK | OK | NG | NG | OK | UNLIMITED |
| 002 | OK | OK | OK | OK | OK | SIX MONTHS |

| FILE ID | TRANSFER | CHANGE | ERASE | COLOR PRINTING | MONOCHROME PRINTING | IP ADDRESS | BOX ID | VALID/INVALID |
|---|---|---|---|---|---|---|---|---|
| | | | | | | | | |
| 012...... | OK | OK | OK | OK | OK | ...... | 002 | |

| FILE NAME | FILE ID | BOX ID | IP ADDRESS OF POLICY MANAGEMENT SERVER |
|---|---|---|---|
| REPORT-20051224 | 012 ······ | 002 | 111.222.33.444 |

FILE ACCESS AUTHORIZATION MANAGEMENT APPARATUS AND METHOD

BACKGROUND OF THE INVENTION

1. Field of the Invention

The present invention relates to an information processing apparatus for managing the security policy of data stored in each of a plurality of storage areas and a data management method in the apparatus.

2. Description of the Related Art

A digital multifunction peripheral with the functions of a copying machine, scanner, and facsimile apparatus has a bulk storage unit formed from, for example, a hard disk to store document files. Such a storage unit has a plurality of storage areas called boxes. Security (settings about each user's access authorization and operation authorization for, e.g., read, write, editing, and printing) is set for each box, thereby ensuring the security of documents in it (Japanese Patent Laid-Open No. 2005-346366). This security setting is called security policy.

As another method of managing access authorization to document files, operation of systems such as Adobe Policy Server to centralize security policy management to a server is beginning.

In the above-described prior art, however, a server must manage all security policies of an enormous number of document files. Every time a document file operation request is issued, access to the server occurs, increasing the load on the server. If a system operates only in the closed environment of a specific group, there may be a need to easily manage security policies based on the operation policy of the group. To send data from a specific group to a device outside the group, the security should reliably be managed under the management of a server such as the Adobe Policy Server capable of managing the security policy of each file. In this case, another demand also arises to change the security policy of each file that is sent to the external device under the management of the Adobe Policy Server in accordance with a change in the operation policy in the specific group.

SUMMARY OF THE INVENTION

It is an object of the present invention to solve the problems of the prior art.

As a characteristic feature of the present invention, it is possible to manage data in a specific storage area in accordance with a specific security policy, thereby easily and properly managing data in a storage area based on a consistent security policy without using an external security policy server.

As another characteristic feature of the present invention, in sending data from each storage area to an external device, the security can be managed and set for each data to be sent.

According to an aspect of the present invention, there is provided an information processing apparatus which has a storage unit having at least one storage area and manages data stored in each storage area, comprising:

a security storage unit configured to store first security information which is set for at least one storage area and contains information representing an operation authorization for data stored in the storage area;

a setting unit configured to set, in transmitting data stored in the storage area to an external device, security information for the data based on the first security information, stored in the security storage unit, set for the storage area; and an update unit configured to update the second security information set by the setting unit based on that first security information set for the storage area is changed.

According to an aspect of the present invention, there is provided a data management method in an information processing apparatus which has a storage unit having at least one storage area and manages data stored in each storage area, comprising:

a storage step of storing, in a memory, first security information which is set for at least one storage area and contains information representing an operation authorization for data stored in the storage area;

a setting step of setting, in transmitting data stored in the storage area to an external device, second security information for the data based on the first security information, stored in the memory, set for the storage area; and an update step of updating the second security information set in the setting step based on that the first security information set for the storage area is changed.

As still another characteristic feature of the present invention, when a managed security policy is changed, the security policy of data already transferred to an external device can also properly be changed.

The means for solving the problem does not list all features of the present invention. Another claim of the present invention and a combination of characteristic features can also constitute the present invention.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
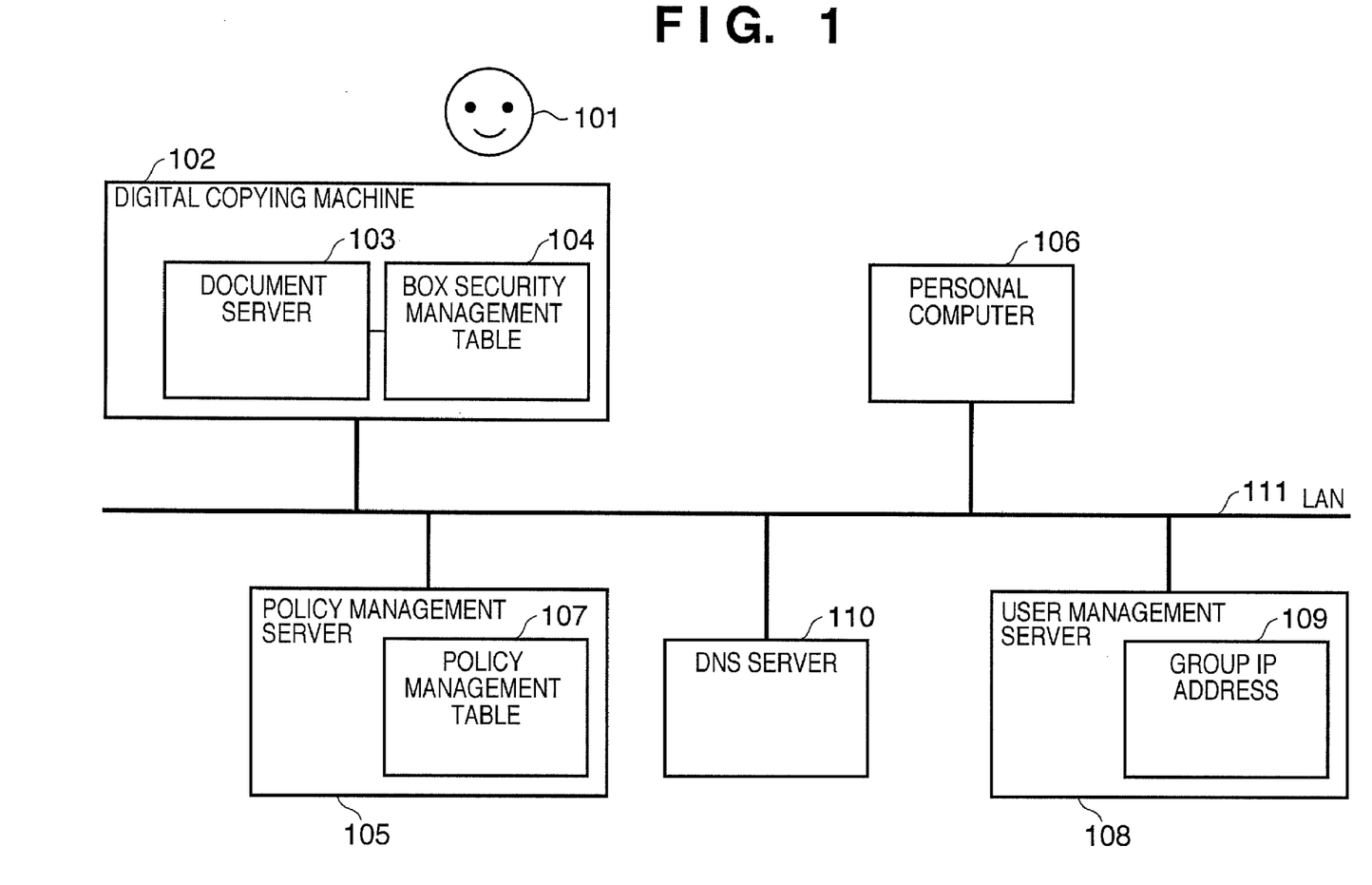
FIG. 1 is a block diagram showing the schematic arrangement of a system including a server and a digital copying machine according to an embodiment of the present invention.

FIG. 1 is a block diagram showing the schematic arrangement of a system including a server and a digital copying machine serving as an information processing apparatus according to an embodiment of the present invention. The digital copying machine is a multifunction peripheral that also functions as a scanner, printer, and facsimile apparatus.

Figure 4:
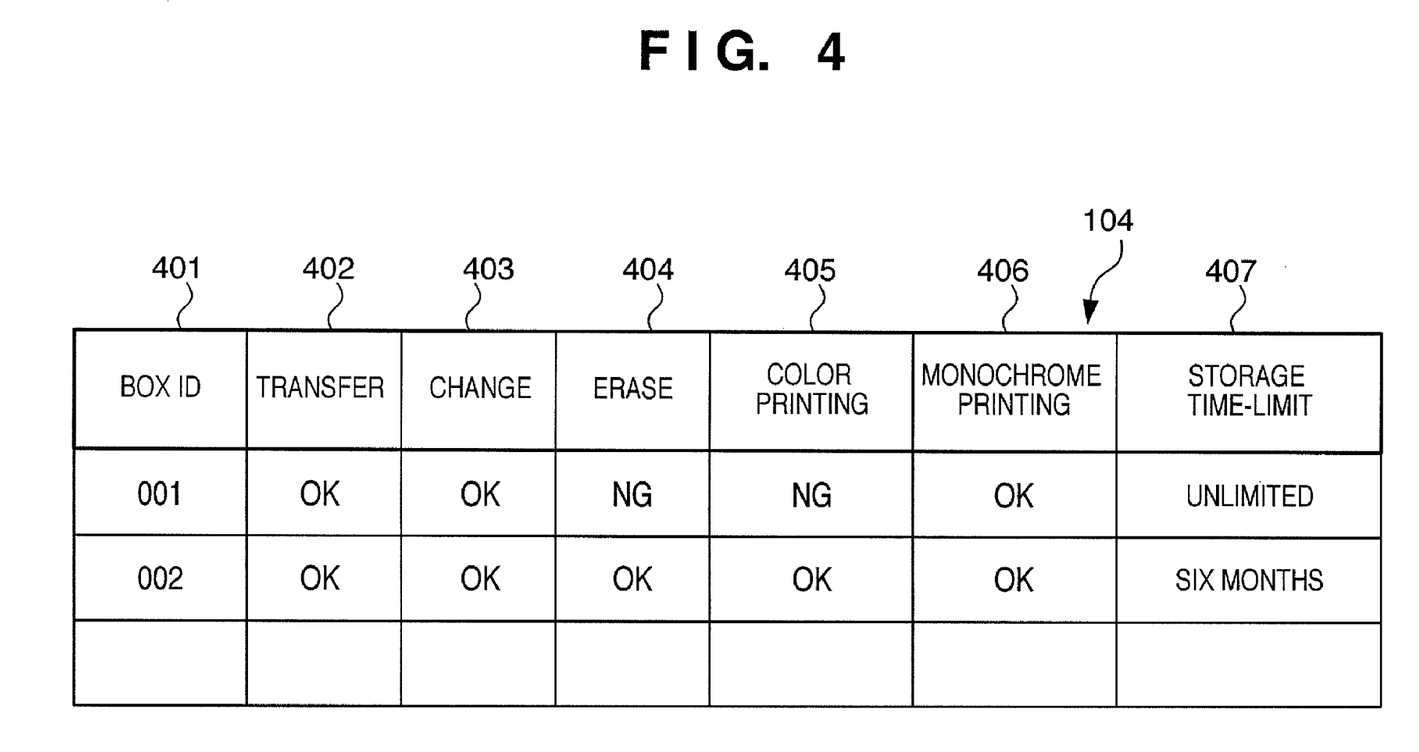
FIG. 4 depicts a view showing an example of a box security management table according to the embodiment.

Referring to FIG. 1, a document server 103 is a server system that stores data in a box of a digital copying machine 102. The "box" is a data storage area formed in the hard disk (HDD) of the copying machine 102 and will be described later in detail. The document server 103 holds a box security management table 104 (FIG. 4). The box security management table 104 stores information about the security of file data stored in each box. All data stored in each box are consistently handled in accordance with the contents of the box security management table 104. The document server 103 and box security management table 104 may be either incorporated in the digital copying machine 102 or arranged outside it.

FIG. 4 depicts a view showing an example of the box security management table 104 according to the embodiment.

A box ID (identifier) 401 specifies a box of the digital copying machine 102. A field 402 stores data indicating whether data in a box is transferable. A field 403 stores data indicating whether data in a box is changeable. A field 404 stores data indicating whether data in a box is erasable. A field 405 stores data indicating whether data in a box is color-printable. A field 406 stores data indicating whether data in a box is monochrome-printable. In the fields 402 to 406, "OK" indicates "enable". Otherwise, "NG" is set. A field 407 stores the storage time-limit of data in each box.

The security of data stored in each box is managed in accordance with the contents of the box security management table 104. In the example in FIG. 4, data in a box with an ID "001" has an "unlimited" storage period. The data is capable of transfer, change, and monochrome printing, though erase and color printing of the data are inhibited.

Figure 5:
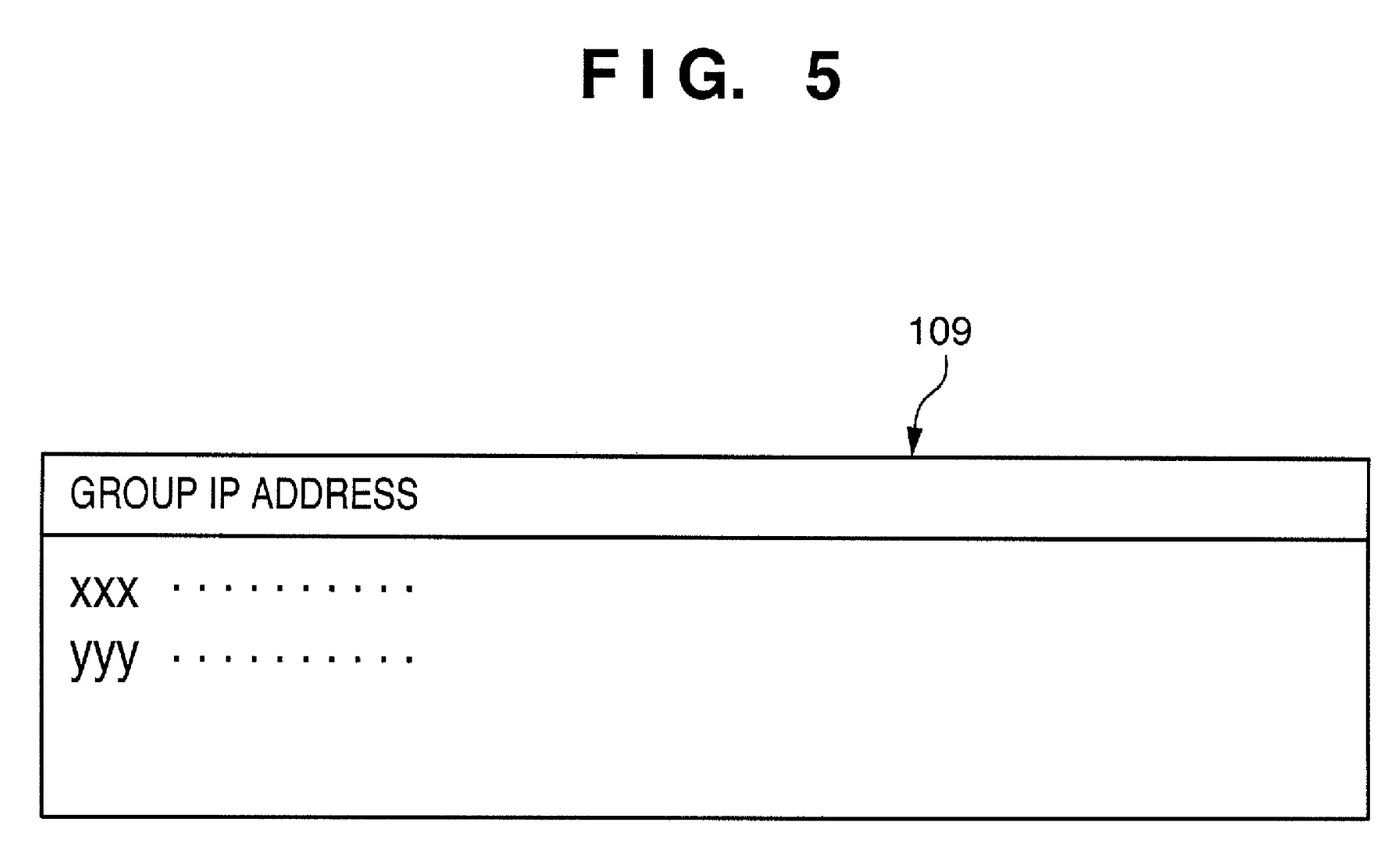
FIG. 5 depicts a view showing an arrangement example of a group IP address table in a user management server according to the embodiment.

A user management server 108 holds group IP addresses 109 (FIG. 5) each of which defines a device (computer or digital copying machine) included in a group as an operation target of the box security management table 104. A user name and a password are held in correspondence with a group IP address. The user name and password are used for user authentication in a user authentication screen on a console unit 213 (FIG. 2) of the digital copying machine 102 shown in FIG. 8.

Figure 8:
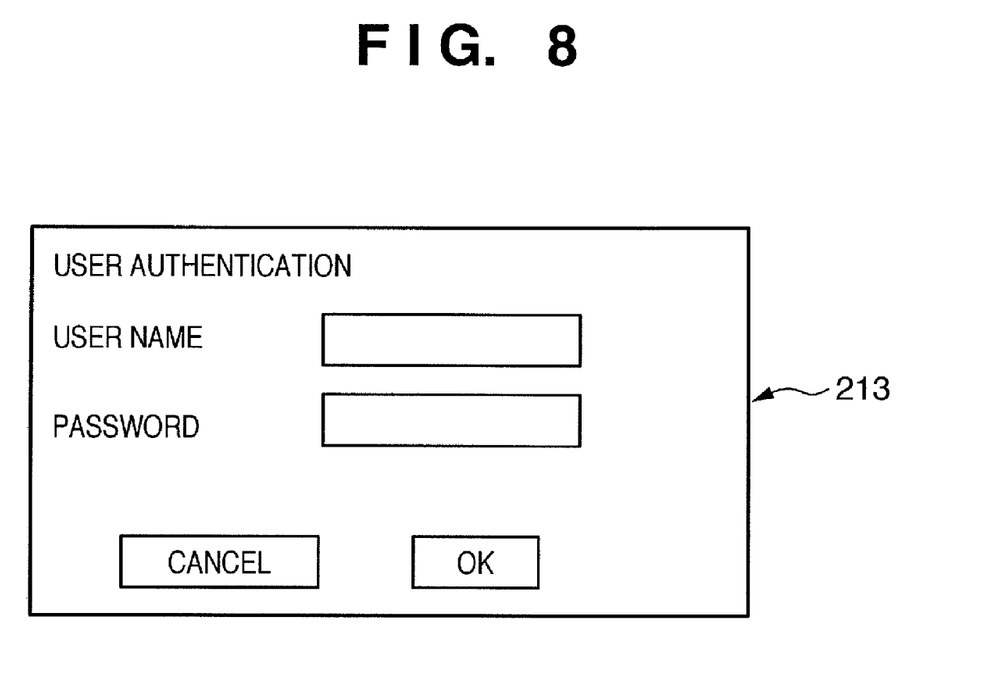
FIG. 8 depicts a view showing an example of an authentication screen displayed on the display unit of the console unit of the digital copying machine according to the embodiment.

FIG. 8 depicts a view showing an example of the authentication screen displayed on the display unit of the console unit 213 (to be described later with reference to FIG. 2) of the digital copying machine 102 according to the embodiment.

When a user 101 inputs a predetermined user name and password and activates the "OK" button, he/she can operate the digital copying machine 102. The "cancel" button is used to cancel the user authentication process.

Figure 7:
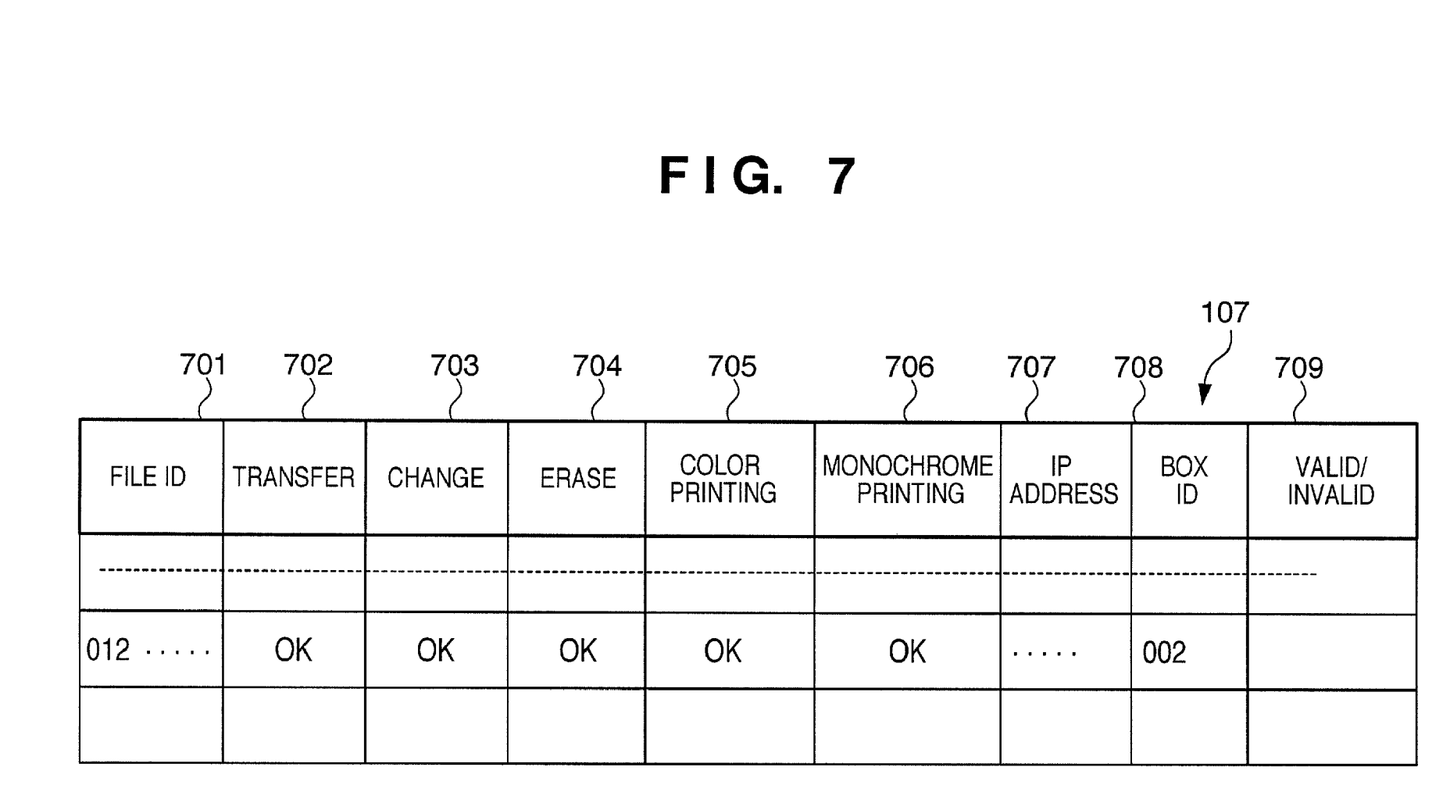
FIG. 7 depicts a view showing an example of a policy management table according to the embodiment.

A policy management server 105 holds a policy management table 107 to manage the security of each data in each box. FIG. 7 shows an example of the policy management table 107. In sending a file to a personal computer 106 except devices included in a common group, restrictions on the use of the file in regards to security are set in accordance with the contents of the box security management table 104 and stored in the policy management table 107.

FIG. 7 depicts a view showing an example of the policy management table 107 according to the embodiment.

A file ID 701 specifies a file of electronic data. Fields 702 to 706 correspond to the above-described fields 402 to 406 of the box security management table 104 shown in FIG. 4, respectively. That is, the fields 702 to 706 have the same values as in the fields 402 to 406 of the security management table 104 for the box that stores the file. An IP address 707 indicates a group IP address that defines a device included in a group as an operation target of the box that stores the file. A box ID 708 is the identification information (ID) of the box that stores the file. A field 709 stores data indicating whether the file is in a valid storage period.

In the example shown in FIG. 7, the security information of a file with a file ID "012 . . ." in a box with a box ID "002" is set. In FIG. 7, the values in the fields 702 to 706 are the same as those in the corresponding fields 402 to 406 (the row of box ID "002") in FIG. 4.

Upon transmitting a file from a box of the digital copying machine 102 to another device, a DNS server 110 decides on a corresponding IP address based on the e-mail address or host name of the transmission destination and notifies the digital copying machine 102 of the decided IP address. In place of the DNS server 110, an SMTP (Simple Mail Transfer Protocol) server (not shown) may decide the IP address of a device from the e-mail address.

Figure 6:
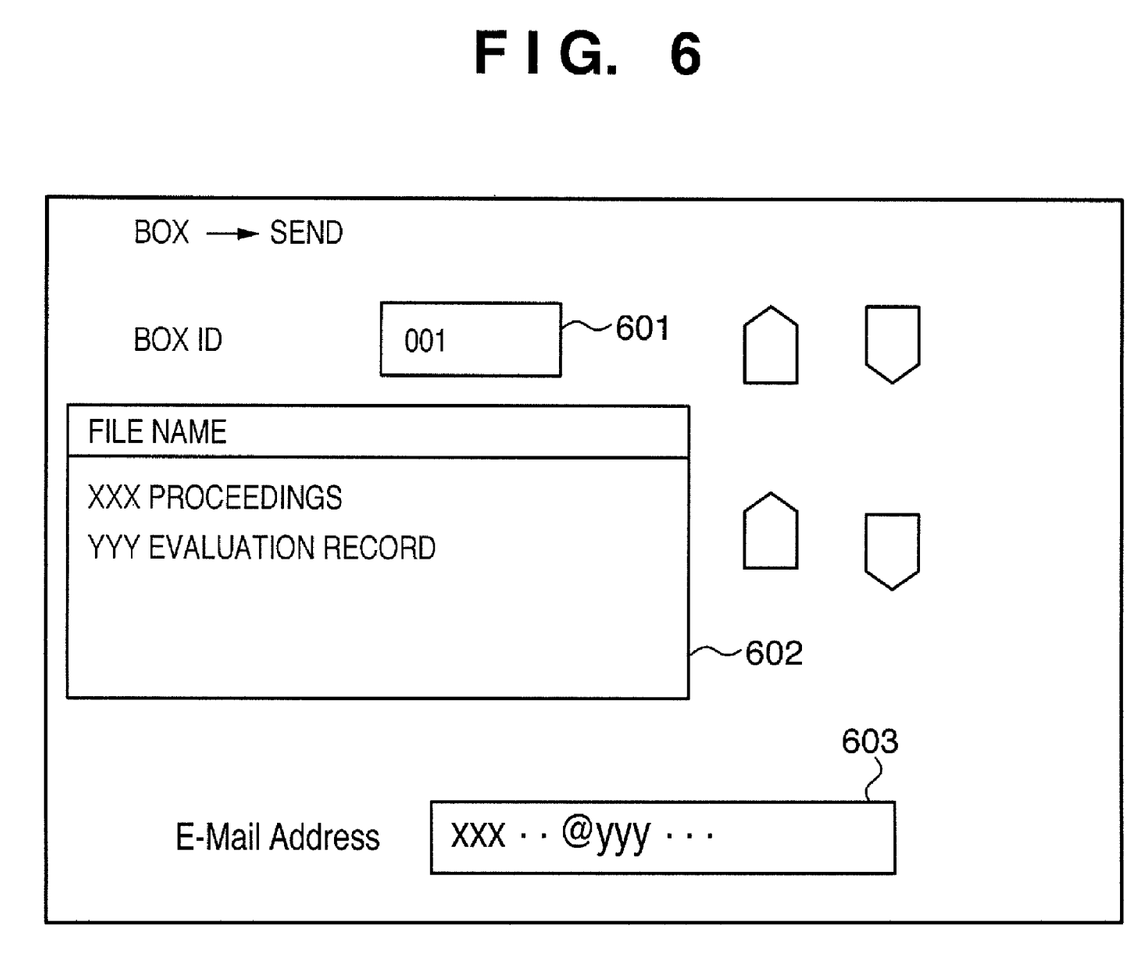
FIG. 6 depicts a view showing an example of a file transfer instruction screen displayed on the display unit of the console unit of the digital copying machine according to the embodiment.

FIG. 6 depicts a view showing an example of a file transfer instruction screen displayed on the display unit of the console unit 213 of the digital copying machine 102 according to the embodiment.

Referring to FIG. 6, reference numeral 601 denotes a box ID input field. A transmission target file is designated in a field 602. The field 602 displays the list of files stored in the box (box ID: 001 in this example) specified in the input field 601. The user 101 selects a transmission target file by using, for example, a cursor (not shown). The selected file name can be made identifiable by highlighting. The user inputs an e-mail address to specify the transmission destination in a field 603. The DNS server 110 decides on a corresponding IP address based on the e-mail address or host name input in the field 603.

The digital copying machine 102, policy management server 105, personal computer 106, user management server 108, and DNS server 110 connect to a LAN (Local Area Network) 111 formed from, for example, Ethernet®.

Figure 2:
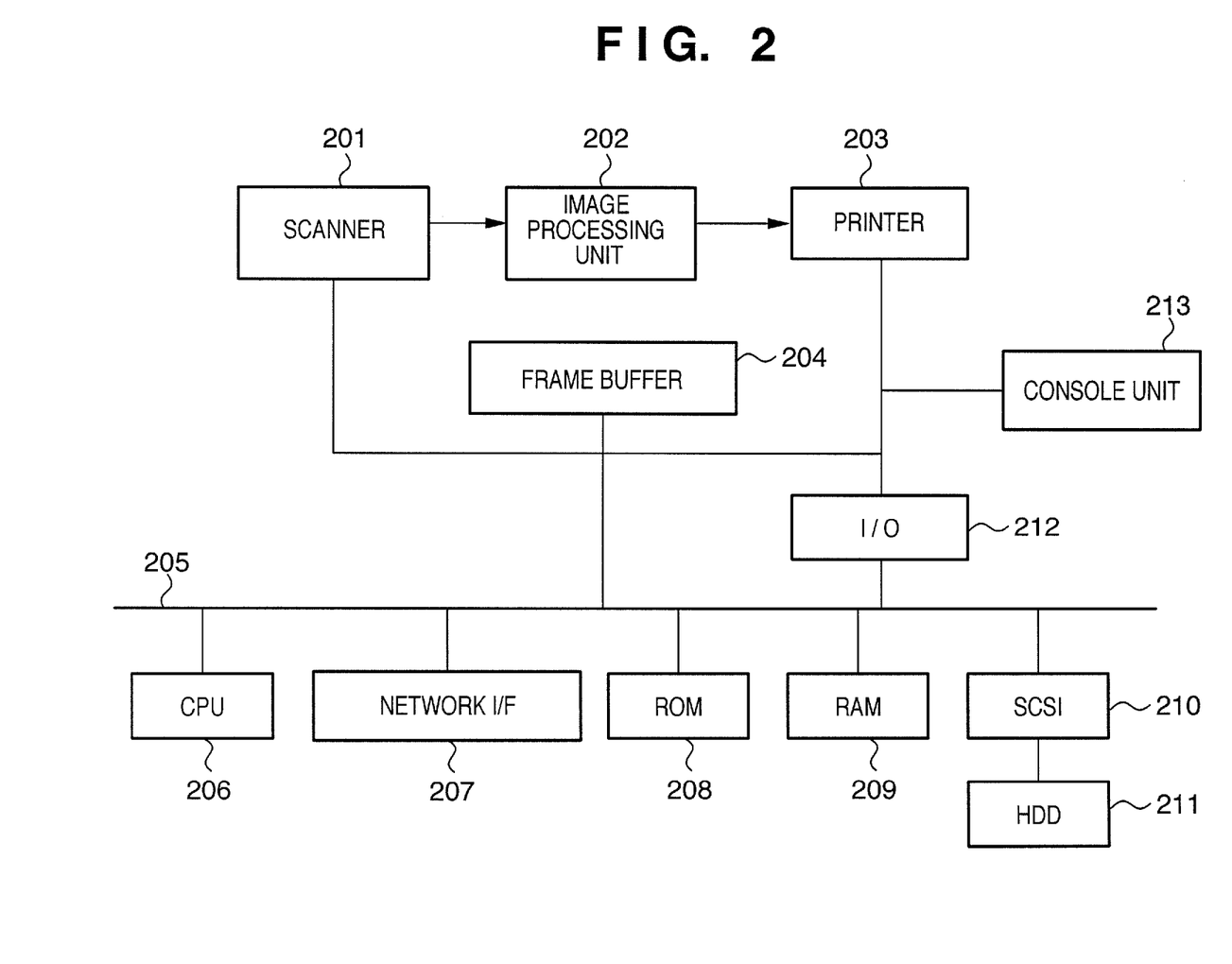
FIG. 2 is a block diagram for explaining the arrangement of a digital copying machine according to the embodiment.

FIG. 2 is a block diagram for explaining the arrangement of the digital copying machine 102 according to the embodiment.

Referring to FIG. 2, a scanner 201 optically reads an original and converts it into an electrical signal to generate original image data. The scanner 201 generates RGB (red, green, and blue) digital data with 8-bit luminance data per pixel. In this embodiment, the read resolution of the scanner 201 is 400 dpi in both the main scanning direction and sub scanning direction. An image processing unit 202 executes processes such as input masking, log conversion from RGB data to CMYK (cyan, magenta, yellow, and black) data, and output masking for the image data received from the scanner 201. A printer 203 receives the frame-sequential CMYK data processed by the image processing unit 202 and prints a color image by, for example, an electrophotographic method.

A frame buffer 204 is formed from a synchronous DRAM with a memory capacity of, for example, 139 MB. The frame buffer 204 stores the raster image data received from the scanner 201 or image data received from the network 111 under the control of a CPU 206. The CPU 206 controls the digital copying machine 102 by executing a program stored in a ROM 208 or loaded from an HDD 211 to a RAM 209. An I/O port 212 connected to a CPU bus 205 outputs a control signal from the CPU 206 to the scanner 201 or printer 203 to control it or receives a signal from, for example, a sensor. The ROM 208 stores a boot program that is executed upon booting the system. The RAM 209 is a synchronous DRAM of, for example, 117 MB. The RAM 209 and frame buffer 204 may form a synchronous DRAM memory module of 256 MB and connect to the CPU bus 205. Programs to be executed by the CPU 206 are installed in the HDD 211, loaded to the RAM 209 in accordance with the boot program in the ROM 208 upon power-on of the copying machine, and executed under the control of the CPU 206.

A SCSI controller 210 connects to the CPU bus 205. The HDD 211 is a hard disk drive connected to the SCSI controller 210. A network I/F 207 connects to the CPU bus 205 and to an external 10BaseT or 100BaseT Ethernet® to exchange data. The personal computer 106 and DNS server 110 shown in FIG. 1 connect to the digital copying machine via the network I/F 207. The console unit 213 includes a display unit such as an LCD, a touch panel, and various kinds of operation buttons.

The HDD 211 of the digital copying machine 102 has a plurality of data storage areas called "boxes". In some cases, whole of the plurality of storage areas is called a box collectively. Alternatively, a certain one of the plurality of storage areas is called a box. The document server 103 manages all the boxes. Each of the plurality of storage areas of the boxes can be specified by a box ID. The box security management table 104 shown in FIG. 4 manages the operation authorization for each box and the storage period of data in each box.

Data stored in a box includes the image data of an original read by the scanner 201 of the digital copying machine 102 and image data obtained by rasterizing print data received from the personal computer 106. A box can also store document data created by the personal computer.

Figure 9:
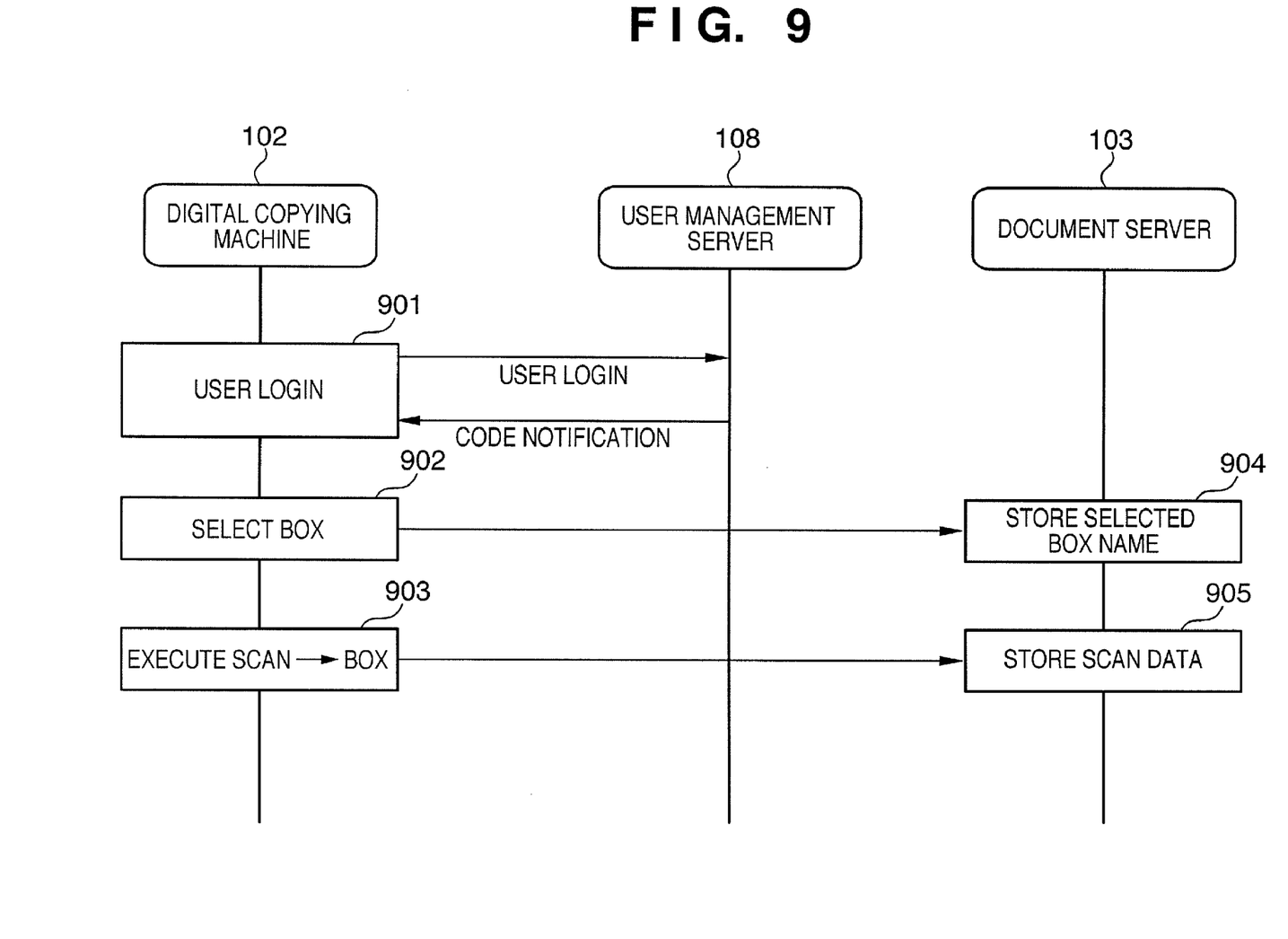
FIG. 9 is a sequence chart for explaining a series of operations until original data read by the scanner of the digital copying machine of the embodiment is stored in a box of a document server.

FIG. 9 is a sequence chart for explaining a series of operations until original data read by the scanner 201 of the digital copying machine 102 of the embodiment is stored in a box of the document server 103.

In 901, the user 101 inputs, from the console unit 213, a user name and password to the user authentication screen (FIG. 8) displayed on the display unit of the console unit 213. The digital copying machine 102 inquires the user management server 108 of the user name and password input in the user authentication screen to check whether the input user name and password are authentic. If they are authentic, the digital copying machine 102 receives an affirmative acknowledgement from the user management server 108 so that the user 101 can log in to the digital copying machine 102. If a negative acknowledgement is received from the user management server 108, the digital copying machine 102 does not receive the login request from the user 101. In 902, a box to store image data read by the scanner 201 is selected.

Figure 3:
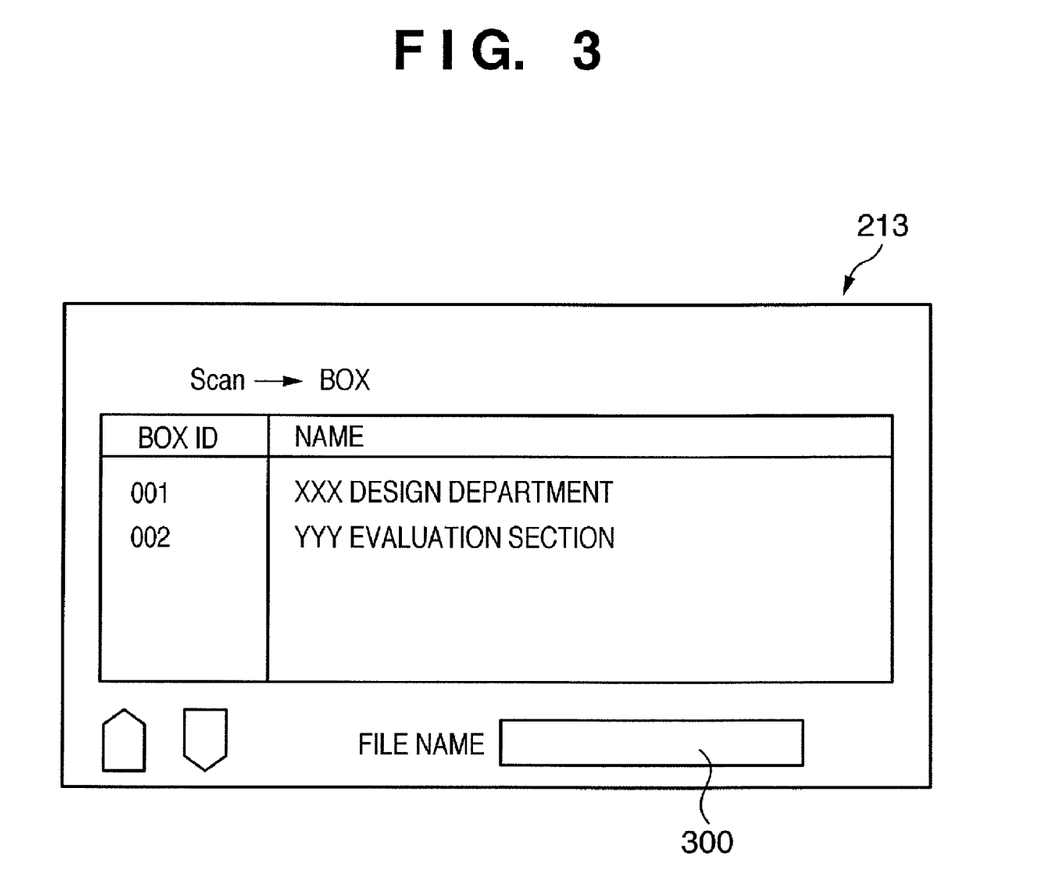
FIG. 3 depicts a view showing an example of a box selection screen displayed on a console unit in selecting a box to store image data in the digital copying machine according to the embodiment.

FIG. 3 depicts a view showing an example of a box selection screen displayed on the display unit of the console unit 213 in selecting a box to store image data.

Referring to FIG. 3, a list of boxes of the document server 103 is displayed. The user 101 selects a box to store image data from the list by using, for example, a cursor (not shown). A file name input field 300 is used to input the file name of image data to be stored in the selected box.

In 902, a box to store image data is selected in the box selection screen displayed on the console unit 213. The file name of the image data to be stored in the box is input to the input field 300 (FIG. 3). In 904, the document server 103 stores the selected box and the file name to be stored in it.

In 903, the digital copying machine 102 sends the data file of the original read by the scanner 201 to the document server 103. In 905, the document server 103 stores the image data sent from the digital copying machine 102 in a storage area (box) of the HDD 211 corresponding to the box name stored in 904.

Figure 10:
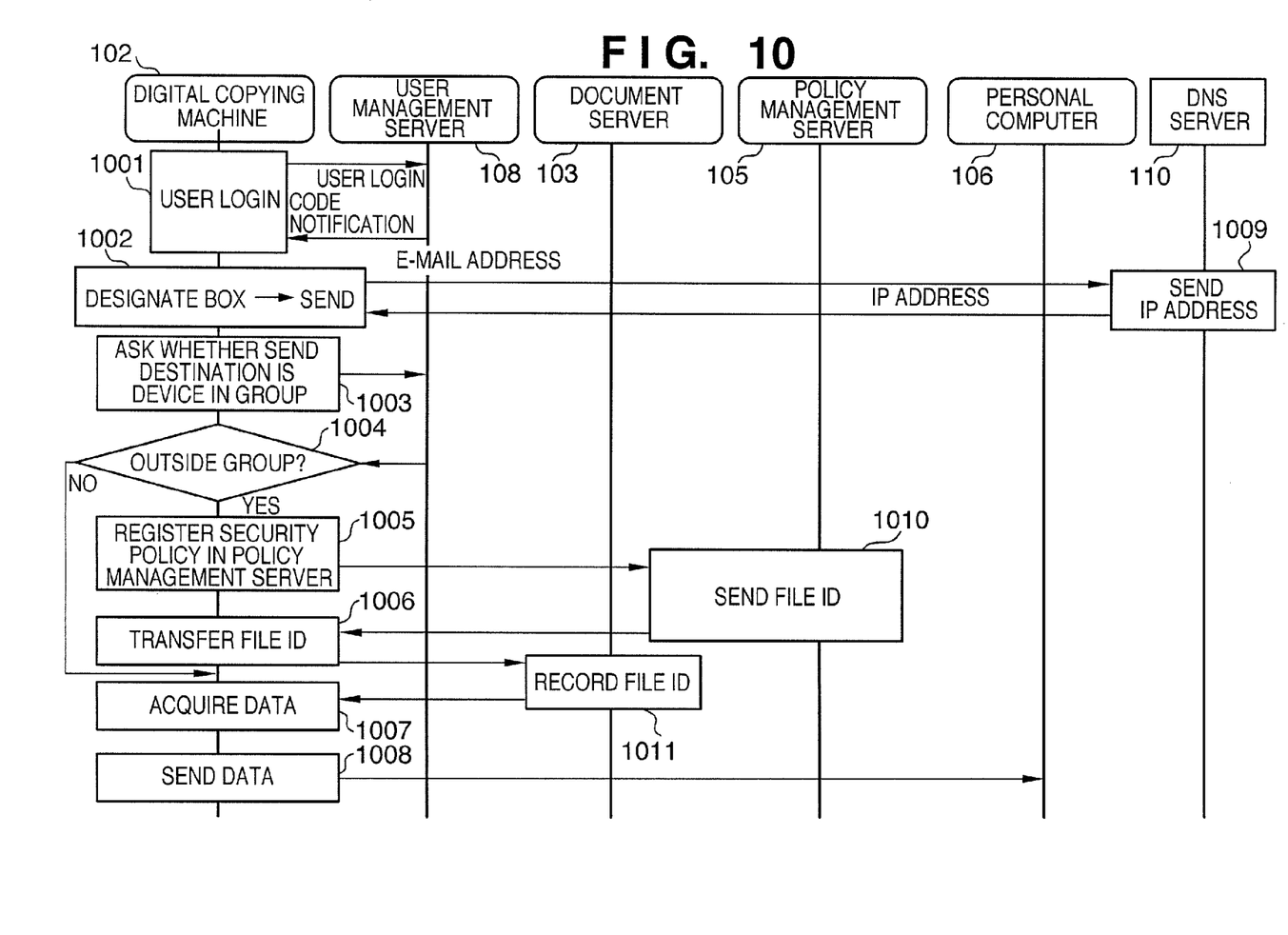
FIG. 10 is a sequence chart for explaining a series of operations of sending a file in the document server according to the embodiment to an external device.

FIG. 10 is a sequence chart for explaining a series of operations of sending data in the document server 103 of the digital copying machine 102 according to the embodiment to an external device (personal computer 106).

In 1001, the user 101 logs in to the digital copying machine 102 by operating the authentication screen (FIG. 8) of the console unit 213, as in 901 in FIG. 9. In 1002, the user 101 selects a box ID and specifies a transmission target file by making operations on the file selection screen (FIG. 6) of the console unit 213. The user 101 also inputs information such as an e-mail address or host name to specify the transmission destination to the input field 603 to decide on the transmission destination. The input information such as the e-mail address is sent to the DNS server 110. In 1009, the DNS server 110 returns an IP address corresponding to the information such as the e-mail address. This allows the digital copying machine 102 to specify the IP address of the transfer destination of the file.

When the IP address is specified, in 1003, the digital copying machine 102 asks the user management server 108 whether the IP address of the data transfer destination is the IP address of a specific group. The user management server 108 determines by referring to the group IP address 109 whether the IP address belongs to a specific group. If the device of the transfer destination does not belong to the specific group, the process in 1005 and 1006 is executed. If the device of the transfer destination is included in the specific group, the process advances to 1007 to acquire the data to be transferred. In 1008, the digital copying machine 102 transmits the data to the personal computer 106 in accordance with the IP address. The e-mail addresses of the devices included in the specific group may be registered in advance in the digital copying machine 102 on the transmitting side. In this case, the digital copying machine 102 can determine whether the e-mail address of the transmission destination is included in the group without inquiring the user management server 108.

In 1005 in FIG. 10, the digital copying machine 102 sends, to the policy management server 105, information in the box security management table 104 (FIG. 4) corresponding to the box that stores the transferred file. With this process, the values of the items "transfer", "change", "delete", "color printing", "monochrome printing", "IP address", "box ID", "valid/invalid" of the policy management table 107 (FIG. 7) managed by the policy management server 105 are set (1010).

That is, the policy management server 105 decides on the file ID of the file and reflects the contents of the box security management table 104 (FIG. 4) corresponding to the box, which are sent from the digital copying machine 102, on the policy management table 107 (FIG. 7) corresponding to the file.

Figure 11:
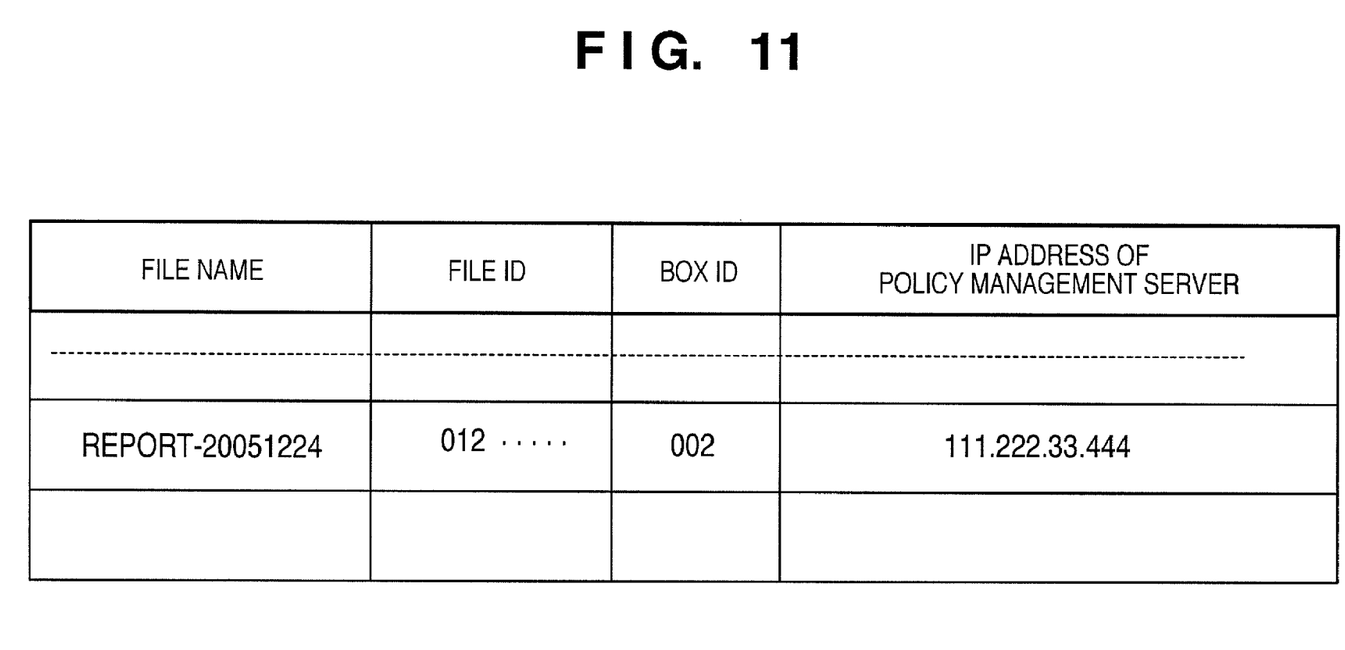
FIG. 11 depicts a view for explaining a registration log table that stores contents registered from the digital copying machine of the embodiment into a policy management server.

FIG. 11 depicts a view for explaining a registration log table that stores contents registered from the digital copying machine 102 of the embodiment to the policy management server 105. The document server 103 manages the registration log table.

The registration log table stores a file name corresponding to data in a designated box, a file ID to specify the file, a box ID to specify a box that stores the file, and the IP address of the policy management server 105 as the transmission destination of the file information. In the example in FIG. 11, a file with a file ID "012..." has a file name "Report_20051224" and is stored in a box with a box ID "002". Setting is done to transmit the file to the IP address "111.222.33.444" of the policy management server 105.

In 1006 in FIG. 10, the digital copying machine 102 transfers, to the document server 103, the file ID sent from the policy management server 105. In 1011, the document server 103 updates the registration log table shown in FIG. 11 and sends the security information of the designated file to the digital copying machine 102.

In 1007, the digital copying machine 102 receives the file designated in 1002 described above from the document server 103. In 1008, the digital copying machine 102 transmits the file to the personal computer 106 of the destination based on the IP address acquired in 1002.

The file transmitted in 1007 after the processes in 1005, 1010, 1006, and 1011 has, as attribute information, the file ID generated by the policy management server 105 and sent to the digital copying machine 102. The IP address of the policy management server 105 is also added as the attribute information of the transmitted file. Adding the file ID generated by the policy management server 105 and the information of the IP address of the policy management server 105 to the file as attribute information is called "adding a policy" to the file.

Upon receiving the file with the added policy, the personal computer 106 executes the following procedure to execute an operation for the file (e.g., an operation of opening the file in an application). The personal computer 106 acquires the file ID and the IP address of the policy management server 105 by referring to the attribute information of the file with the added policy. The file ID and the IP address of the personal computer 106 are transmitted to the IP address. The policy management server 105 confirms by looking up the policy management table 107 shown in FIG. 7 based on the received file ID that the IP address of the personal computer 106 is included in the IP addresses 707 in FIG. 7. The policy management server 105 returns, to the personal computer 106, OK/NG information of various kinds of operation authorization (e.g., transfer, change, and erase) defined for the file ID. If the IP address of the personal computer 106 is not included in the field of the IP address 707 in FIG. 7 corresponding to the file ID, the policy management server 105 notifies the personal computer 106 that it has no operation authorization for the file.

Upon receiving the information about the operation authorization from the policy management server 105, the personal computer 106 controls Ok/NG of various operations for the file in accordance with the received operation authorization information.

In the above-described manner, even when a file whose access authorization is managed in the document server 103 is transmitted to an external device, access authorization management as in the document server 103 can be implemented by using the policy management server 105.

Figure 12:
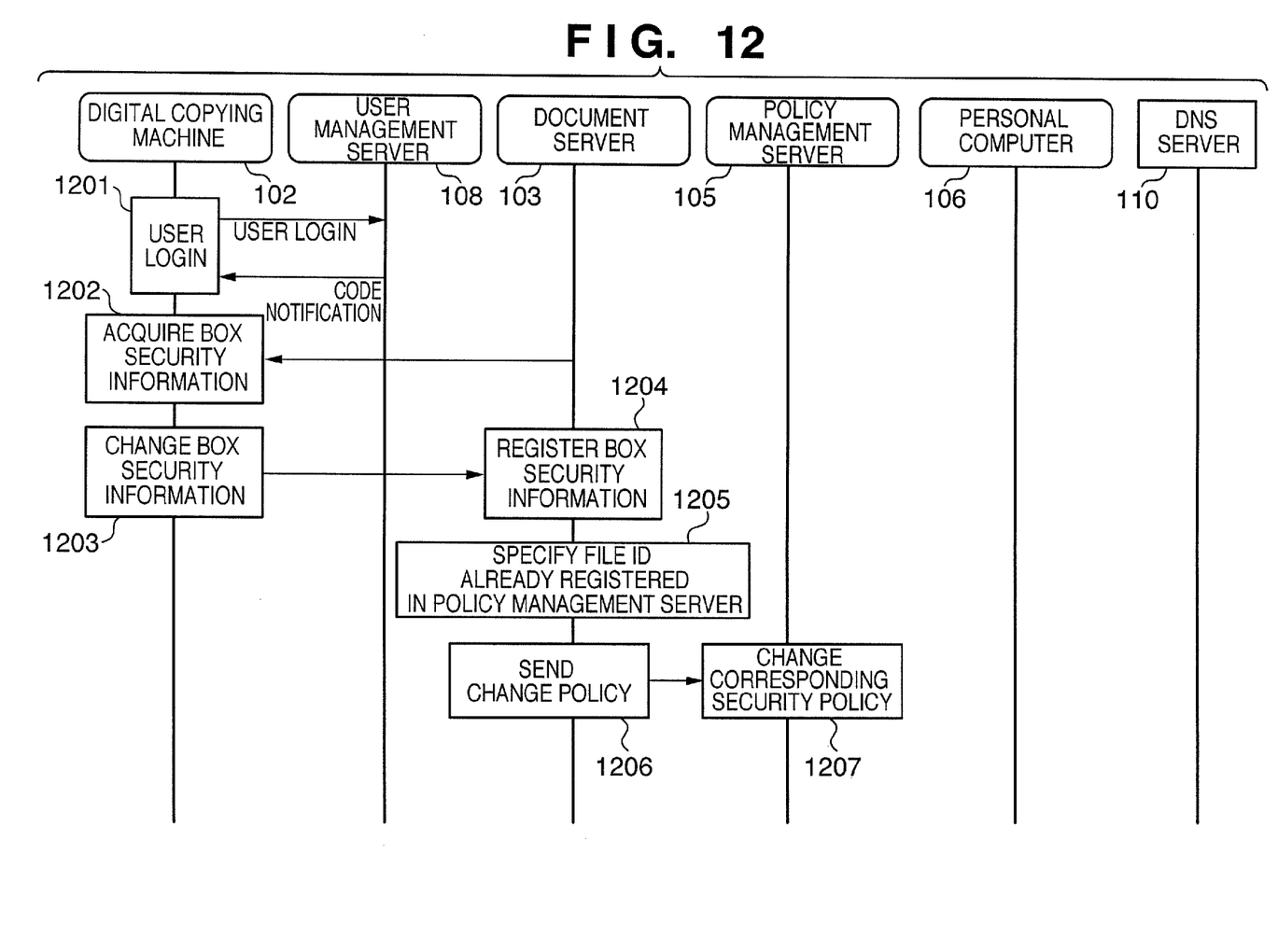
FIG. 12 is a sequence chart for explaining the sequence of a process of changing box security management information of the digital copying machine according to the embodiment.

FIG. 12 is a sequence chart for explaining the sequence of a process of changing box security management information of the digital copying machine 102 according to the embodiment.

In 1201, the user 101 logs in to the digital copying machine 102 by operating the authentication screen (FIG. 8) of the console unit 213, as in 901 described above in FIG. 9. The operation from 1202 is possible only when the user 101 has the authorization of the system administrator. In 1202, the digital copying machine 102 acquires the information of the box security management table 104 (FIG. 4) from the document server 103. In 1203, the user of the digital copying machine 102 gives the instruction to change the box security management information. For, for example, a box ID "002" in FIG. 4, both "color printing" and "monochrome printing" are set to "OK". Assume that an instruction is issued to change these settings to "NG".

In 1204, the document server 103 changes the data in the box security management table 104 in accordance with the box security management information as the target of the change instruction. In 1205, the registration log table (FIG. 11) to the policy management server 105, which is held in the document server 103, is searched to specify a registered file ID corresponding to the box with the box security management information changed in 1203.

In 1206, the document server 103 notifies the policy management server 105 of the file ID specified in 1205 and the changed box security management information. In 1207, the policy management server 105 changes the policy management table 107 (FIG. 7) in it in accordance with the contents received from the document server 103. In this example, both "color printing" and "monochrome printing" in the policy management table 107 are set to "NG" in accordance with the changed box security management information.

With this process, the change in the box security management table 104 in the document server 103 is reflected on the policy management server 105. Hence, even an access authorization to a file transmitted from the document server 103 to an external device can be managed based on the same contents as the security management information changed in the box security management table 104.

As described above, according to this embodiment, it is possible to manage data in a specific storage area (box) of a digital copying machine in accordance with a specific security policy, thereby easily and properly managing data in a box based on a consistent security policy.

In sending file data from a box of the digital copying machine to an external device, the security can be managed and set for each data file to be sent. This allows for proper management of the security of file data transmitted from the digital copying machine to an external device.

When the security policy of a specific storage area (box) of the digital copying machine is changed, corresponding information on the policy management server side can also be changed. This makes it possible to reflect a change in the security policy managed in the digital copying machine on the operation of the security policy of even file data that is already transferred to an external device.

OTHER EMBODIMENTS

The embodiment of the present invention has been described above in detail. The present invention is applicable to a system including a plurality of devices or an apparatus including a single device.

The present invention is also achieved by supplying a software program to implement the functions of the above-described embodiment to the system or apparatus directly or from a remote site and causing the computer of the system or apparatus to read out and execute the supplied program. In this case, only the function of the program is necessary, and the form need not always be a program.

Hence, the program codes themselves which are installed in a computer to implement the functional processing of the present invention also implement the present invention. That is, the claim of the present invention also incorporates the computer program itself to implement the functional processing of the present invention. In this case, the program can take any form such as an object code, a program to be executed by an interpreter, or script data to be supplied to the OS as long as the functions of the program are available.

Examples of a recording medium to supply the program are a floppy® disk, hard disk, optical disk, magnetooptical disk, MO, CD-ROM, CD-R, CD-RW, magnetic tape, nonvolatile memory card, RON, and DVD (DVD-ROM and DVD-R).

To supply the program, a client computer may connect to a homepage on the Internet via a browser to download the program from the homepage to a recording medium such as a hard disk. The computer program of the present invention itself or a compressed file containing an automatic installation function can be downloaded. The program codes contained in the program of the present invention may be divided into a plurality of files so that the user can download the files from different homepages. That is, a WWW server which causes a plurality of users to download the program file to implement the functional processing of the present invention is also incorporated in the claim of the present invention.

The program of the present invention may be encrypted, stored in a storage medium such as a CD-ROM, and distributed to users. Any user who satisfies predetermined conditions can download key information to decrypt the program from a homepage via the Internet. The user can install the encrypted program in a computer in an executable form by using the key information.

The functions of the above-described embodiment are implemented even without causing the computer to execute the readout program. For example, the functions of the above-described embodiment are also implemented when, for example, the OS running on the computer partially or wholly executes actual processing based on the instructions of the program.

The program read out from the recording medium may be written in the memory of a function expansion board inserted into the computer or a function expansion unit connected to the computer. Then, the CPU of the function expansion board or function expansion unit partially or wholly executes actual processing based on the instructions of the program, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-145883, filed May 25, 2006, which is hereby incorporated by reference herein in its entirety.

What is claimed is:

1. An information processing apparatus, comprising:
a security storage unit configured to store first security information which is set for a storage area and represents an authorization for an operation for data stored in the storage area;
a setting unit configured to set second security information which is set for data to be transmitted to an external device and represents an authorization for an operation for the data to be transmitted to the external device, based on the first security information stored in the security storage unit; and
an update unit configured to, in a case where the first security information stored in the security storage unit is changed, update the second security information set by the setting unit based on the changed first security information.

2. The apparatus according to claim 1,
wherein the setting unit is configured to send the first security information to a security management server, so as to set the second security information for the data to be transmitted to the external device, the security management server being capable of communicating with the information processing apparatus and managing the authorization for the operation for the data transmitted to the external device, and
wherein the update unit is configured to send the changed first security information to the security management server, so as to update the second security information stored in the security management server in accordance with the change of the first security information.

3. The apparatus according to claim 2, wherein if the external device executes the operation for the data transmitted to the external device, the external device is configured to transmit an ID associated with the data transmitted to the external device to the security management server, the security management server is configured to transmit to the external device the authorization for the operation based on the ID, and the external device is configured to control execution of the operation for the data in accordance with the authorization.

4. The apparatus according to claim 1, further comprising a changing unit configured to change an e-mail address of a transmission destination of the data stored in the storage area to an IP address.

5. The apparatus according to claim 1, wherein the first and second security information contains at least one of pieces of information representing data change, erase, transmission, color printing enable/disable, and a term of validity of data.

6. The apparatus according to claim 1, wherein,
the setting unit is configured to set the second security information so that the authorization represented by the second security information corresponds to the authorization represented by the first security information, and
the update unit is configured to update the second security information so that the authorization represented by the second security information corresponds to the authorization represented by the changed first security information.

7. The apparatus according to claim 1, further comprising:
a storage unit configured to store the data to be transmitted to the external device in the storage area.

8. The apparatus according to claim 1, further comprising:
a scanner configured to optically read an image and generate image data,
wherein the image data is stored in the storage area.

9. The apparatus according to claim 1, wherein
the security storage unit is configured to store the first security information which represents authorizations for a plurality of operations for data stored in the storage area, and
the setting unit is configured to set the second security information which represents authorizations for the plurality of operations for the data to be transmitted to the external device.

10. The apparatus according to claim 1, further comprising:
a transmitting unit configured to transmit the data to the external device, the second security information being set for the data transmitted by the transmitting unit.

11. A data management method in an information processing apparatus, comprising:
a storage step of storing, in a memory, first security information which is set for a storage area and represents an authorization for an operation for data stored in the storage area;
a setting step of setting second security information which is set for data to be transmitted to an external device and represents an authorization for an operation for the data to be transmitted to the external device, based on the first security information stored in the memory;
a changing step of changing the first security information stored in the memory; and
an update step of updating the second security information set in the setting step based on the changed first security information.

12. The method according to claim 11, wherein in the setting step, the second security information for the data to be transmitted to the external device is sent to a security management server capable of communicating with the information processing apparatus and managing an authorization for an operation for the data transmitted to the external device, so as to set the second security information for the data to be transmitted to the external device, and
in the update step, the changed first security information is sent to the security management server, so as to update the second security information stored in the security management server in accordance with the change of the first security information.

13. The method according to claim 11, further comprising a step of changing an e-mail address of a transmission destination of the data stored in the storage area to an IP address.

14. The method according to claim 11, wherein the first and second security information contains at least one of pieces of information representing data change, erase, transmission, color printing enable/disable, and a term of validity of data.

15. A non-transitory computer readable storage medium for storing a program which causes a computer to execute a data management method, the data management method comprising:
a storage step of storing, in a memory, first security information which is set for a storage area and represents an authorization for an operation for data stored in the storage area;
a setting step of setting second security information which is set for data to be transmitted to an external device and represents an authorization for an operation for the data to be transmitted to the external device, based on the first security information stored in the memory;
a changing step of changing the first security information stored in the memory; and
an update step of updating the second security information set in the setting step based on the changed first security information.

* * * * *